(12) United States Patent  
Greiner-Perth et al.

(10) Patent No.: US 9,233,384 B2  
(45) Date of Patent: Jan. 12, 2016

(54) DISCHARGING DEVICE

(75) Inventors: Juergen Greiner-Perth, Gottmadingen (DE); Matthias Wochele, Rielasingen-Worblingen (DE); Judith Auerbach, Niederteufen (CH)

(73) Assignee: APTAR RADOLFZELL GMBH, Radolfzell (DE)

( * ) Notice: Subject to any disclaimer, the term of this patent is extended or adjusted under 35 U.S.C. 154(b) by 72 days.

(21) Appl. No.: 14/005,664

(22) PCT Filed: Feb. 22, 2012

(86) PCT No.: PCT/EP2012/053024  
§ 371 (c)(1),  
(2), (4) Date: Oct. 31, 2013

(87) PCT Pub. No.: WO2012/126692  
PCT Pub. Date: Sep. 27, 2012

(65) Prior Publication Data  
US 2014/0042188 A1 Feb. 13, 2014

(30) Foreign Application Priority Data  
Mar. 18, 2011 (DE) .......................... 10 2011 005 820

(51) Int. Cl.  
*B05B 11/00* (2006.01)  
*G01F 11/02* (2006.01)  
*G01F 11/32* (2006.01)  
*G01F 11/26* (2006.01)  
*B65D 47/06* (2006.01)

(52) U.S. Cl.  
CPC ......... *B05B 11/3005* (2013.01); *B05B 11/0029* (2013.01); *B05B 11/0059* (2013.01);  
(Continued)

(58) Field of Classification Search  
CPC ............. B65D 47/2075; B65D 47/061; B65D 83/0044; B05B 11/306; B05B 11/3059; B05B 11/3005; B05B 11/0029; B05B 11/0059; B05B 11/3001; B05B 11/3008; B05B 11/3015; B05B 11/3094; G01F 11/028; G01F 11/021; G01F 11/26; G01F 11/32; G01F 11/023; G01F 11/025  
USPC ................ 222/153.13, 309, 319–320, 321.1, 222/321.6, 496, 513  
See application file for complete search history.

(56) References Cited

U.S. PATENT DOCUMENTS 2,989,215 A * 6/1961 Willingham ................... 222/207  
4,061,254 A * 12/1977 Nilson .......................... 222/494

(Continued)

FOREIGN PATENT DOCUMENTS

DE 31 33 835 A1 3/1983  
DE 60 2004 000 369 T2 10/2006  
WO WO 91/13689 9/1991

OTHER PUBLICATIONS

Office Action of German Patent Office issued in German Application No. 10 2011 005 820.6 dated Aug. 23, 2011 (5 pages).

(Continued)

*Primary Examiner* — Frederick C Nicolas  
(74) *Attorney, Agent, or Firm* — Flynn, Thiel, Boutell & Tanis, P.C.

(57) ABSTRACT

A dispenser for discharging liquids with a liquid reservoir for accommodating the liquid prior to being discharged, and a liquid outlet passage which leads to a liquid outlet opening through which the liquid reservoir communicates with a surrounding atmosphere. In a use position, the liquid outlet opening is arranged below the liquid reservoir such that the liquid flows on account of the weight thereof in the direction of the liquid outlet opening, and the liquid outlet passage in the use position does not simultaneously permit air to enter the liquid reservoir and liquid to exit into the surrounding atmosphere. In order to reduce the internal volume of the dispenser and therefore to effect a discharge of liquid, a slide is pushed manually in an actuating direction from a stroke starting position into a stroke end position.

11 Claims, 3 Drawing Sheets

(52) U.S. Cl.
CPC .......... *B05B11/3001* (2013.01); *B05B 11/306* (2013.01); *B05B 11/3008* (2013.01); *B05B 11/3015* (2013.01); *B05B 11/3094* (2013.01); *G01F 11/023* (2013.01); *G01F 11/025* (2013.01); *B05B 11/3059* (2013.01); *B65D 47/061* (2013.01); *G01F 11/26* (2013.01); *G01F 11/32* (2013.01)

(56) References Cited

U.S. PATENT DOCUMENTS

| | | | | |
|---|---|---|---|---|
| 4,506,803 | A | * | 3/1985 | Franklin et al. ................ 222/1 |
| 4,886,193 | A | * | 12/1989 | Wassilieff .................... 222/446 |
| 4,930,689 | A | | 6/1990 | Stumpf |
| 4,946,069 | A | * | 8/1990 | Fuchs .......................... 222/43 |
| 5,427,280 | A | | 6/1995 | Fuchs |
| 6,164,498 | A | | 12/2000 | Faughey et al. |
| 6,330,960 | B1 | * | 12/2001 | Faughey et al. ............. 222/205 |
| 7,503,466 | B2 | | 3/2009 | Ramet |
| 2004/0217133 | A1 | | 11/2004 | Ramet |

OTHER PUBLICATIONS

Form PCT/ISA/210 International Search Report with English translation date of mailing May 21, 2012 (4 pages).

\* cited by examiner

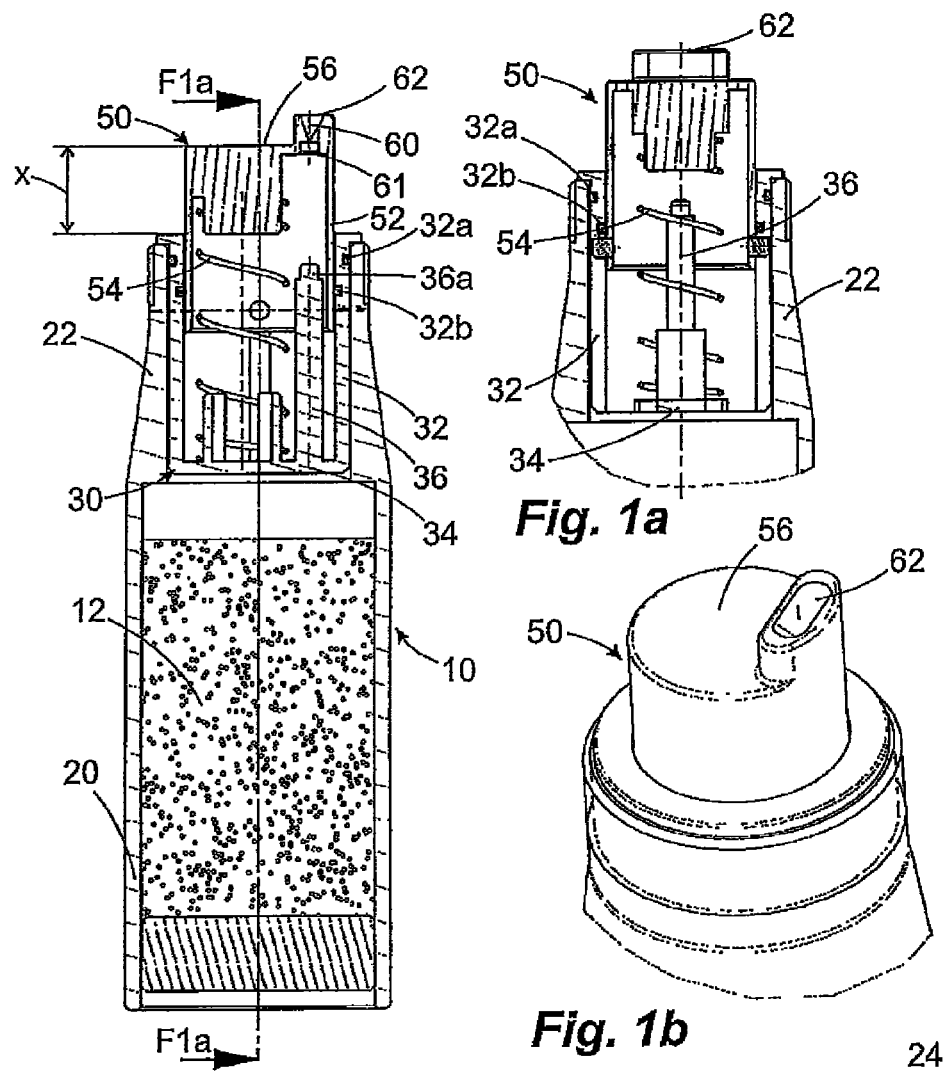

DISCHARGING DEVICE

FIELD OF APPLICATION AND PRIOR ART

The invention relates to a dispenser for discharging liquids including a liquid reservoir for accommodating the liquid prior to being discharged and a liquid outlet passage which leads to a liquid outlet opening, through which liquid outlet passage the liquid reservoir is communicated to a surrounding atmosphere. For that matter, such a dispenser is provided and designed for use in a use position in which the liquid outlet opening is arranged below the liquid reservoir such that the liquid flows on account of the weight thereof in the direction of the liquid outlet opening. Furthermore, such a dispenser is provided to have the liquid outlet passage designed in such a manner that, at least in the use position, said liquid outlet passage does not simultaneously permit air to enter the liquid reservoir and liquid to exit into the surrounding atmosphere.

Dispensers for liquids are generally known for pharmaceutical and cosmetic applications. The present dispenser is in particular provided to be a dispenser for pharmaceutical liquids, like cough mixture or the like, for example.

The special aspect of such dispensers is in that there are no valves provided between the liquid reservoir and the liquid outlet opening, but instead the liquid outlet is limited in that, due to dimensioning of the liquid outlet passage, simultaneous exit of liquid and entering of air is prevented. Thus, upon bringing the dispenser in a use position, there is initially liquid passing through the liquid outlet opening disposed below the liquid level only until the low pressure thereby arising in the liquid reservoir will not prevent said flow. The liquid outlet passage is arranged to prevent follow-up air flow in response to the low pressure, arising during transfer of the dispenser in the use position.

Such dispensers are known as so-called "Squeeze Bottles", for example. With such bottles, the liquid reservoir as a whole can be compressed due to flexible outer walls. Thereby, the low pressure arising in the liquid reservoir is compensated and an overpressure is produced in the liquid reservoir, causing a further amount of liquid to flow out of the liquid outlet opening, in the use position.

With "Squeeze Bottles", the liquid amount output by the dispenser during a discharge operation is difficult to control. Due to the flexible walls, the volume reduction of the liquid reservoir is greatly dependent on the force applied by the user.

OBJECT AND SOLUTION

The object of the invention is to further develop a generic dispenser such that a liquid amount is discharged in a quite precise and repeatable manner by simple ways and means.

According to the invention it is provided that, in order to reduce the internal volume of the dispenser and therefore to effect a discharge of liquid, a slide which can be pushed manually in an actuating direction from a stroke starting position up to a stroke end position is provided.

To begin with, a dispenser according to the invention has the features of the generic dispenser. For instance, it has a liquid reservoir, the walls thereof being largely non-deformable or at least do not need to be deformed during an intended discharge procedure. Said liquid reservoir is communicated to a surrounding atmosphere via a liquid outlet passage having a liquid outlet opening at the end. During the intended use of the dispenser in an overhead position, in which the liquid outlet opening is located below the liquid level in the liquid reservoir, not only a pump chamber or the like, but the liquid reservoir as such communicates with the surrounding environment via said liquid outlet passage. So that a complete discharge of the liquid stored in the liquid reservoir does not occur without further action, the liquid passage is designed in a manner that follow-up air flow through the liquid present in the liquid passage or applied thereto is prevented in the overhead position. Thus, if the dispenser is transferred into the use position from a position other than the use position, in particular a position, in which the outlet opening is provided at the top end, as a result, there is only a minor amount of liquid discharged. Initially, there is an end of discharge, as soon as the low pressure arising in the liquid reservoir and the weight of the liquid are balanced at the liquid outlet passage. The meaning of not simultaneous entering of air and exit of liquid is that with the boundary conditions of a liquid having a viscosity of 1 mPa·s (water at 20° C.) and an 80% filling of the liquid reservoir after transfer of the dispenser to the use position, there is neither continuous complete draining of liquid with simultaneous continuous inflow of air, nor complete draining of liquid, with short intermittences, wherein air is drawn in through the liquid outlet.

To allow, based on such a situation, wherein regardless of the use position the liquid remains largely within the liquid reservoir, discharge of a defined amount of the liquid, the intended slide is provided, and is adapted to be displaced into the dispenser preferably against the force of a return spring, to reduce the internal volume of the liquid reservoir and the liquid chambers connected thereto, respectively, and to thus cause a pressure increase in the liquid reservoir. Thereby, a liquid amount is discharged through the liquid outlet opening that is affected essentially by the volume pushed aside by the slide.

The volume reduction caused by the movement of the slide between its stroke starting position and its stroke end position is preferably between 0.5% and 15% of the total volume of the liquid reservoir in relation to a positioning of the slide in the stroke starting position. Particularly preferred are configurations, wherein the volume reduction is in a range between 1% and 12%, in particular between 2% and 8%. Thus, a dispenser having an internal volume of about 100 cm$^3$ can conveniently have a slide which by transfer from the stroke starting position to the stroke end position causes a volume displacement of between 5 cm$^3$ and 10 cm$^3$.

Particularly advantageous is a configuration of the dispenser according to the invention, wherein the dispenser comprises a body of a bottle constituting the liquid reservoir having a bottle neck and an insert inserted in the bottle neck, wherein the liquid outlet opening and the slide are provided on the insert. Said configuration is of particular advantage in that it can be used with liquid reservoirs in the form of a bottle without specific adaptation. A liquid reservoir in bottle form is to mean a liquid reservoir including an access opening at a port forming the bottle neck, wherein said port is cylindrical on the interior surface thereof, and/or provided with an internal thread and/or external thread, preferably at least in sections. According to a refinement of the invention, the insert is attached to said bottle neck and said insert is inserted into the bottle neck, respectively. Said insert includes both the liquid outlet opening and the slide. Preferably, the insert has a section, in particular an approximately hollow cylindrical section, provided fixed in position on the bottle neck upon installation. In relation thereto, at least the slide is displaceable, preferably in the direction of extension of the bottle neck.

The outlet opening as well provided on the insert can be fixed in position in relation to the bottle neck in the installed condition. An alternative design proposes that the liquid outlet opening is provided on the slide, and thus is moved together with said slide. Said design can be advantageous in view of the closing unit that will be described below.

Furthermore, a dispenser according to the invention preferably includes a closing unit which, upon positioning the slide in the stroke starting position or in the stroke end position, shuts off the liquid reservoir from the liquid outlet opening. This allows tight closing of the dispenser for a time between use events, and thus prevents both the entering of contaminations and the escape of liquid due to diffusion. The closing unit is configured such that the liquid reservoir is shut off from the liquid outlet opening as a function of the slide positioning. In particular, it can be provided that the closing unit in the stroke end position effects said shut-off. To provide a reliable shut-off during non-use of the dispenser, it is particularly advantageous, when the dispenser comprises a cap, wherein said cap in the placed-on condition is capable of displacing the slide to its stroke end position so that the closing unit shuts off the liquid reservoir from the liquid outlet opening. Thus, said design proposes that the slide is exposed at least partially in the stroke starting position, so that by placing the cap on, the slide is displaced up to a position, in which the closing unit is closing. In addition to the hereby involved exposed positioning of the slide to the stroke starting position, which allows easy actuation, the activation of the closing unit by means of the cap prevents inadvertent neglect of activating the closing unit.

A particularly simple and advantageous embodiment of a closing unit proposes that said unit includes a recess, in which in the stroke end position or the stroke starting position of the slide, a plug of the closing unit is inserted in the actuating direction or counter to the actuating direction. Said recess is preferably cylindrical, the same as the plug, so that reliable sealing and at the same time quite high tolerance in view of the insertion depth of the plug into the recess is provided. Preferably, the recess is fixed in position to the slide and the liquid outlet passage disposed thereon. In contrast, the plug is preferably fixed in position relative to the liquid reservoir. In particular, the plug can be an end portion of a pin extending in the actuating direction or counter to the actuating direction and aligned with the recess. Preferably, the liquid outlet passage is provided on the bottom of the recess.

As an alternative thereto, it can also be provided that the flow unit has an inlet to the liquid outlet passage approximately orthogonal to the moving direction of the slide, and a closing area is provided on the slide, to shut-off the inlet, when the slide is disposed in its stroke end position or its stroke starting position. Thus, with such a design, the closing condition is not produced in that a plug is driven into a recess of the closing unit. Instead, the access to the liquid outlet passage is covered, when the slide is disposed in the stroke end position.

A simple embodiment of the dispenser according to the invention provides that the slide is always displaceable from a defined stroke starting position up to a defined stroke end position, in which stroke end position an output end is caused by the closing unit, as the case may be, so that thereby a predetermined volume is displaced. However, it can be an advantage that an additional adjustment unit is provided, by means of which the stroke length of the slide can be reduced, in order that, as a function of the adjustment, the slide is displaceable from the starting position merely up to an intermediate position, wherein the adjustment unit is configured preferably for reducing the length of stroke by a rotary movement of the slide or a rotary movement of an adjustment element rotating around an axis parallel to the actuating direction.

Thus, the adjustment unit allows selective discharge of smaller volumes than the maximum volume, without need for the user to interrupt the stroke movement of the slide deliberately and at a not precisely defined location. Instead, the movability of the slide is reduced continuously or in steps. This is achieved in particular by stops, grooves or ridges provided on the slide and cooperating with stops, ridges or grooves on a section fixed in position to the liquid reservoir in such a manner that displacing the slide is possible merely up to an intermediate position, that is variable as a function of the adjustment of the adjustment unit, wherein the stops, ridges or grooves contact one another in a move limiting manner. Thus, the metering can be adjusted to be different for an adult or a child, for example.

The simplest form of adjustability is obtained with a rotating slide. Thus, the slide can bring one of a plurality of provided ridges or stops, differing one from the other by their extension or arrangement in the direction of actuation, into a rotary position, wherein said ridge is limiting the stroke movement of the slide, for example. Instead of the slide as such, even a separate adjustment section displaceable relative to the slide as well as the liquid reservoir, can be provided and preferably also be rotating.

Preferably, the dispenser furthermore comprises a locking unit, by means of which the slide can be locked in a locking position, said position preferably corresponding to the stroke starting position. Such a locking unit can in particular be a child-proof lock. Said locking unit can be provided together with the above described adjustment unit. For example, a ridge or a groove of the adjustment unit can be assigned to the locking condition and be dimensioned and/or disposed such that there is none or only an inessential stroke movability of the slide remaining.

In particular with the embodiment of the locking unit for a child-proof locking unit, an advantage is that for unlocking, a movement beyond the rotary displacement of the slide or a portion separate therefrom is required. Said movement could be an axial displacement of an additionally provided blocking ring, for example.

In a refinement of the invention the liquid reservoir is communicated to the surrounding atmosphere exclusively via the outlet opening. Thus, there is accordingly no separate venting duct provided. What is achieved thereby is that the low pressure generated in the liquid reservoir upon resetting the slide to the stroke starting position thereof causes drawing back of liquid from the outlet passage. Thus, delay dripping is prevented.

Furthermore, an advantage is that the liquid outlet passage has a widening shape. Thus, the passage is a diffusor and decreases the flow rate of the exiting liquid. This is an advantage in particular with liquids intended to be dispensed in droplet form. The unintentional formation of a spray jet is prevented.

BRIEF DESCRIPTION OF THE DRAWINGS

Further advantages and aspects of the invention arise in addition to the claims also from the following description of two preferred exemplary embodiments of the invention, illustrated in relation to the figures.

FIGS. 1 and 1a to 1c illustrate a first embodiment of a dispenser according to the invention;

DETAILED DESCRIPTION OF THE EXEMPLARY EMBODIMENTS

Figure 1D:
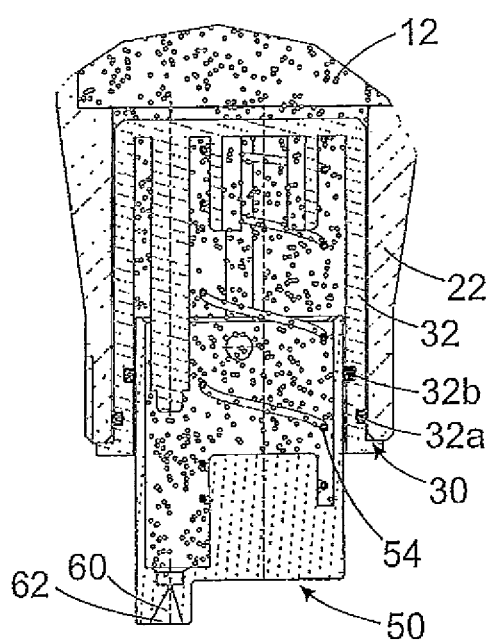
FIGS. 1d and 1e illustrate a discharge operation of the dispenser according to FIGS. 1 to 1c.

FIGS. 1 and 1a to 1c show a first embodiment of a dispenser according to the invention.

The dispenser 10 comprises a liquid reservoir 20, of a bottle type. An insert 30 is inserted into a bottle neck 22 of the bottle. Said insert 30 has a housing 32 and, with the exterior surface thereof, rests on the internal surface of the bottle neck 22, sealed by an O-ring 32b. The interior cavity of the housing 32 is not isolated in the direction of the medium 12 in the liquid reservoir 20 contained in the dispenser. As apparent from FIG. 1a, the liquid can flow into the insert 30 undisturbed past a ridge 34 of the housing 34, when the dispenser 10 is oriented accordingly.

In the housing 32 of the insert 30 a slide 50 is provided which is guided by a shell surface 52 relative to an interior surface of the housing 32. For liquid tight sealing, the O-ring 32b is provided here as well. By means of a spring 54 resting on the ridge 34 of the housing 32, force is permanently applied to the slide 50 toward the exterior. Furthermore, a liquid outlet passage 60 ending in an outlet opening 62 is also provided on the slide 50. Adjacent to the outlet opening 62, a manipulation zone 56 is provided on the slide, by means of which the slide 50 can be displaced manually against the force of the spring 54 in the direction of the liquid reservoir 20.

The internal volume of the dispenser 10 including the internal volume of the insert 30 in the condition of FIG. 1 is about 100 cm³. Due to the manually caused displacement of the slide 50 in the direction of the liquid reservoir 20 by the length x intended therefor of about 13 mm, the internal volume can be reduced by about 5%.

As shown in FIG. 1c, beyond that even a further displacement of the slide 50 relative to the housing 30 by another about 7 mm is possible, which displacement is effected when a cap 24 is put on. Said cap 24 with a sealing area 24a inserted therein allows, by putting the cap on, the slide 50 to displace towards the interior such that a pin end 36a of a pin 36 enters into a recess 61 constituting the inlet area of the liquid outlet passage 60, and thus a contamination seal is formed.

Figure 1E:
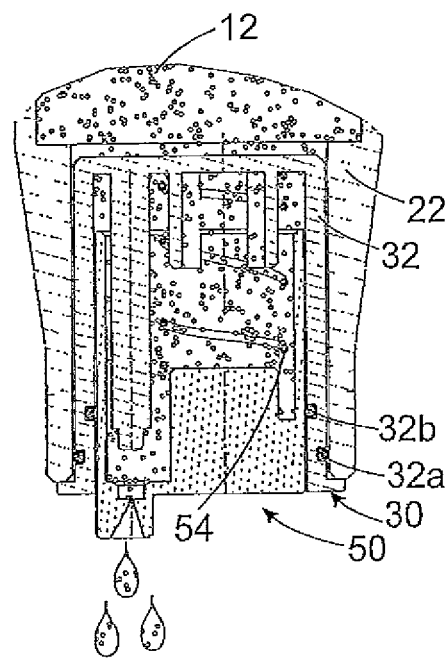

The intended use of the dispenser according to FIGS. 1 and 1a to 1c is illustrated in FIGS. 1d and 1e.

According to the intended use, the dispenser is used in an overhead position, where the liquid outlet opening 62 faces downward, and thus is located below the liquid level of the liquid 12. FIG. 1d illustrates the condition after tilting the dispenser. Since there are no liquid shut-off devices, like valves or the like, provided between the housing 32 of the insert 30 and the liquid reservoir 20, liquid 12 will flow into the insert 30 because of its weight at the transition into the orientation of FIG. 1d. There is immediately discharge of a small amount of liquid 12, since there are no valves or the like provided at the outlet opening 62. However, said discharge is rapidly ending, namely as soon as a low pressure has formed within the liquid container 20 that is balanced with the weight of the liquid 12.

Starting in said condition, the slide 50 is inserted in the direction of the liquid reservoir 20 by applying force to the manipulation zone 56. Thereby the internal volume of the dispenser 10 is reduced by about 5%. There pressure is increased and thus a discharge of liquid through the outlet opening 62 occurs. In contrast to conventional dispensers with a piston pump, there is not a segregated portion of liquid in a pump chamber discharged completely or almost completely, but pressure is applied to the content of the dispenser as a whole.

Figure 2:
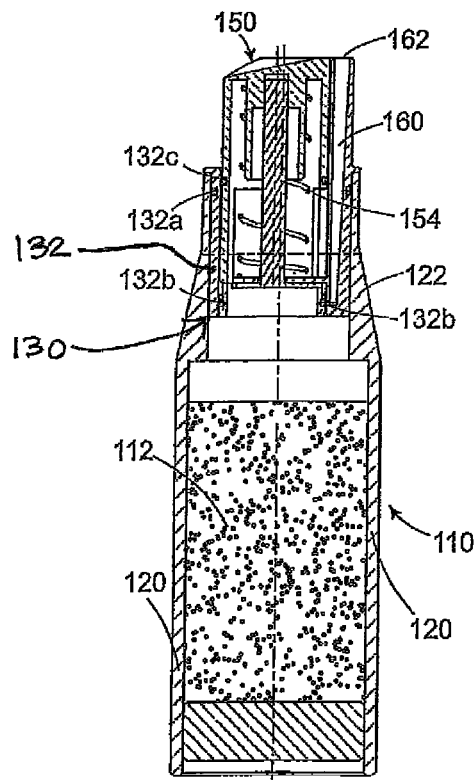
FIGS. 2, 2a, 2b illustrate a second embodiment of a dispenser according to the invention.
Figure 2A:
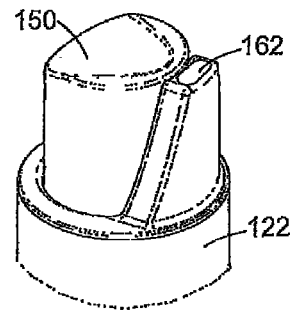
Figure 2B:
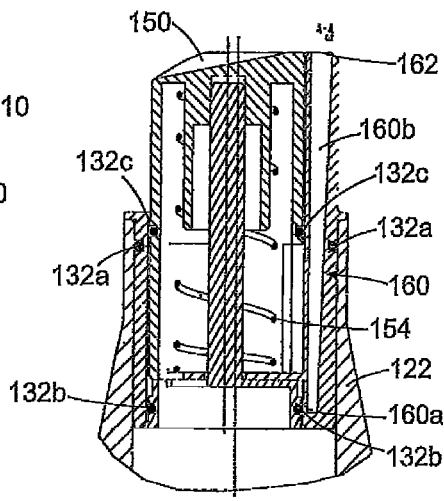

The FIGS. 2, 2a and 2b show a related embodiment of a dispenser. The dispenser 110 also has a bottle-type shape with a liquid reservoir 120 and a bottle neck 122. Again, an insert 130 having a housing 132 is inserted into the bottle neck 122, said housing remaining fixed in position at all times during use. With this design as well, there is again a slide 150 provided which can be displaced to reduce the internal volume of the dispenser 110, in the present case similarly by 5%. The resulting functional operation is largely comparable to that of the dispenser of FIGS. 1a to 1e. A difference is in that the dispenser according to FIGS. 2, 2a and 2b does not have the outlet opening 162 provided immediately on the slide 150, but on the housing 132 of the insert 130, and thus always remains fixed in position thereto. To nevertheless achieve closure of the liquid outlet passage 160 by the slide 150 in the starting position thereof, an inlet portion 160a of the liquid outlet passage 160 is oriented not axially, but instead radially. In the stroke starting position illustrated in FIGS. 2 and 2b, an O-ring 132b disposed between the housing 132 and the slide 150 is immediately above said passage portion 160a and thus closes said passage.

Even the design of the main portion 160b adjoining portion 160a of the liquid outlet passage 162 presents a specific feature. Said passage has a flaring cross section. It has been observed that the disposition of the liquid to exit in the form of an undesirable jet can be counteracted by such an enlargement.

Figure 3:
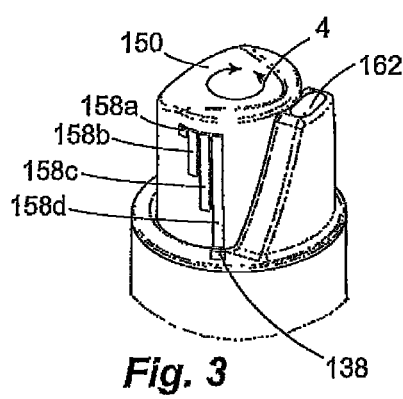
FIG. 3 illustrates a variant of the second embodiment of a dispenser according to the invention.

FIG. 3 shows a variant of the embodiment of FIGS. 2, 2a and 2b. As apparent in FIG. 3, there are a total for four ridges 158a to 158d provided on an outer face of the slide 150. To cooperate with said ridges 158a to 158d, there is a protrusion 138 provided on the internal face of the housing 132, indicated in dashed lines only in FIG. 3, which protrusion is a stop, wherein each of the protrusions 158a to 158d when aligned therewith can not be moved past the stop. In the embodiment of FIG. 3, the slide 150 rotates to a limited extent, in the manner as indicated by the arrow 4, to allow one to select one of the ridges 158a to 158d for alignment with the stop 138. The rotatability is preferably limited by not illustrated stops, and preferably there are detent means or the like provided to allow haptic sensing, when one of the ridges 158a to 158d is aligned with the stop 134.

When the stop 138 is aligned with the first ridge 158a, a complete or almost complete stroke movement of the slide 150 is possible. By turning the slide 150 and by using the ridges 158b and 158c, the stroke may be reduced to ⅔ and ⅓, respectively, of the total stroke length. When by the ways and means as illustrated in FIG. 3 the ridge 158a is aligned with the stop 138, the stroke movability of the slide 150 is almost completely limited. Thus, the condition as illustrated in FIG. 3 presents a locked condition.

A comparable adjustment arrangement to allow specific discharge of a reduced amount of liquid may be provided also with the embodiment according to FIGS. 1, 1a to 1e. However, due to the eccentric arrangement of the pin 36, another structure would have to be selected in this case. Thus, a sleeve-type intermediate element could be provided between the housing 132 and the slide 150, for example, rotating relative to the housing 32 and thereby allowing rotative variation of stops, ridges or grooves disposed thereon to limit the stroke. Since the functional operation of such an adjustment ring is not easy to comprehend for children, such a design would simultaneously also present a child-proof lock.

The invention claimed is:

1. A dispenser for discharging liquids, comprising:
   a liquid reservoir for accommodating liquid prior to being discharged;
   a liquid outlet passage which leads to a liquid outlet opening through which the liquid reservoir is communicated to a surrounding atmosphere, the dispenser being designed for use in a use position, in which the liquid outlet opening is arranged below the liquid reservoir such that the liquid flows on account of a weight thereof in a direction of the liquid outlet opening, and the liquid outlet passage is designed in such a manner that, at least in the use position, said liquid outlet passage does not simultaneously permit air to enter the liquid reservoir and liquid to exit into the surrounding atmosphere;
   a slide manually pushable in an actuating direction from a stroke starting position into a stroke end position in order to reduce an internal volume of the dispenser and therefore to effect a discharge of the liquid; and
   a closing unit which, upon positioning of the slide in the stroke starting position and/or in the stroke end position, shuts off the liquid reservoir from the liquid outlet opening.

2. The dispenser according to claim 1, wherein the dispenser comprises a body of a bottle constituting the liquid reservoir and having a bottle neck, and an insert inserted in the bottle neck, wherein the liquid outlet opening and the slide are provided on the insert.

3. The dispenser according to claim 2, wherein the liquid outlet opening is provided on the slide and moves together with said slide.

4. The dispenser according to claim 1, wherein the dispenser comprises a cap, wherein said cap in an installed condition on the dispenser displaces the slide to the stroke end position so that the closing unit shuts off the liquid reservoir from the liquid outlet opening.

5. The dispenser according to claim 1, wherein the closing unit has a recess in which, in the stroke end position or in the stroke starting position of the slide, a plug of the closing unit is inserted in the actuating direction or counter to the actuating direction, the plug being fixed in position relative to the liquid reservoir and the recess being fixed in position relative to the slide.

6. The dispenser according to claim 1, wherein the closing unit has an inlet to the liquid outlet passage oriented approximately orthogonal to a moving direction of the slide, and a closing area is provided on the slide to block the inlet when the slide is disposed in the stroke end position or the stroke starting position.

7. The dispenser according to claim 1, further including an adjustment unit for reducing a length of stroke of the slide such that, as a function of the adjustment, the slide is displaceable from the stroke starting position merely up to an intermediate position, wherein the adjustment unit is configured for reducing the length of stroke by a rotary movement of the slide or a rotary movement of an adjustment element rotating around an axis parallel to the actuating direction.

8. The dispenser according to claim 1, further including a locking unit for locking the slide in a locking position, said locking position corresponding to the stroke starting position.

9. The dispenser according to claim 1, wherein the liquid reservoir communicates with the surrounding atmosphere exclusively via the liquid outlet opening.

10. The dispenser according to claim 1, wherein the liquid outlet passage has a widening shape.

11. The dispenser according to claim 1, wherein the liquid outlet passage has a cross-section which flares outwardly as the liquid outlet passage extends towards the liquid outlet opening.

* * * * *